(12) United States Patent
Gupta et al.

(10) Patent No.: US 7,030,875 B2
(45) Date of Patent: Apr. 18, 2006

(54) ENVIRONMENTAL REASONING USING GEOMETRIC DATA STRUCTURE

(75) Inventors: Rakesh Gupta, Cupertino, CA (US); Jie Gao, Mountain View, CA (US)

(73) Assignee: Honda Motor Company Ltd., Tokyo (JP)

( * ) Notice: Subject to any disclaimer, the term of this patent is extended or adjusted under 35 U.S.C. 154(b) by 313 days.

(21) Appl. No.: 10/235,165

(22) Filed: Sep. 4, 2002

(65) Prior Publication Data
US 2004/0044441 A1    Mar. 4, 2004

(51) Int. Cl.
*G06T 15/00* (2006.01)
(52) U.S. Cl. .................. 345/419; 345/420; 700/246; 382/153
(58) Field of Classification Search ............... 345/419, 345/420; 715/500.1
See application file for complete search history.

(56) References Cited

U.S. PATENT DOCUMENTS

| | | | |
|---|---|---|---|
| 5,036,474 A | | 7/1991 | Bhanu et al. |
| 5,564,004 A | | 10/1996 | Grossman et al. |
| 6,031,540 A | | 2/2000 | Golin et al. |
| 6,097,381 A | * | 8/2000 | Scott et al. ............... 715/500.1 |
| 6,133,921 A | * | 10/2000 | Turkiyyah et al. ......... 345/420 |
| 6,304,675 B1 | | 10/2001 | Osbourn et al. |
| 6,734,849 B1 | * | 5/2004 | Dimsdale et al. ........... 345/419 |

FOREIGN PATENT DOCUMENTS

| | | |
|---|---|---|
| JP | 07-085136 | 3/1995 |
| JP | 11-073526 | 3/1999 |

OTHER PUBLICATIONS

Sheehy et al. "Computing the Medial Surface of a solid from a Domain Delaunay Triangulation", ACM 1995, pp. 201-212.*
Bras-Mehlman, E. Le et al., "How the Delaunay Triangulation Can Be Used for Representing Stereo Data," IEEE International Conference on Computer Vision ($2^{nd}$), 1988, pp. 54-63, ISBN 0-8186-0883-8.
Gao, Jie et al., "Efficient Proximity Search for 3-D Cuboids," Lecture Notes in Computer Science, May 2003, vol. 2669, pp. 817-826.

(Continued)

*Primary Examiner*—Kimbinh T. Nguyen
(74) *Attorney, Agent, or Firm*—Fenwick & West LLP

(57) ABSTRACT

A method of representing spatial relations among objects in the environment uses a Delaunay triangulation as the data structure to store the spatial relations when the objects are represented in the form of simplified objects such as cuboids. The method receives image data corresponding to the environment and recognizes the objects in the image data, and updates the Delaunay triangulation so that the Delaunay triangulation is consistent with the recognized objects. Furthermore, a proximity query can be carried out using the Delaunay triangulation.

35 Claims, 12 Drawing Sheets

OTHER PUBLICATIONS

Gross, Eric M., "Function Learning Enhancement with Delaunay Linear Interpolation and K-D Tree Nearest Neighbor Retrieval," Proceedings of the American Control Conference, Jun. 1995, vol. 5, pp. 3791-3795.

Jones, Christopher B. et al., "Proximity Search with a Triangulated Spatial Model," The Computer Journal, 1998, vol. 41, No. 2, pp. 71-83.

Zeta, Dan et al., "Data Input Model for Virtual Reality-Aided Facility Layout," IIE Transactions, Jul. 1998, vol. 30, No. 7, pp. 597-620.

International Search Report dated Oct. 14, 2003, for International Application No. PCT/JP03/10943, filed on Aug. 28, 2003.

Agarwal, P.K., et al., "Box-trees and R-trees with Near-Optimal Query Time," Proceedings of the 17th ACM Symposium on Computational Geometry (SoCG 01') (Jun. 2001), pp. 124-133.

Agarwal, Pankaj K., et al., "Geometric Range Searching and Its Relatives," Contemporary Mathematics (1999), vol. 23, pp. 1-56, American Mathematical Society Press, Providence, RI.

Attali, D., et al., "A Linear Bound on the Complexity of the Delaunay Triangulation of Points on Polyhedral Surfaces," submitted to ACM Solid Modeling (2002).

Aurenhammer, F., "Voronoi Diagrams: A Survey of a Fundamental Geometric Data Structure," ACM Computing Surveys (Sep. 1991), vol. 23, No. 3, pp. 345-405.

Byers, John A., "Dirichlet Tessellation of Bark Beetle Spatial Attack Points," Journal of Animal Ecology (1992), vol. 61, pp. 759-768.

Edwards, Geoffrey, et al., "Toward the Simulation of Spatial Mental Images Using the Voronoi Model," Representation and Processing of Spatial Expressions (1997), pp. 163-184, edited by Patrick Olivier and Klaus-Peter Gapp.

Erickson, J., "Dense Point Sets Have Sparse Delaunay Triangulations," 13th SIAM Conference Discrete Algorithms (2002), pp. 125-134.

Erickson, J., "Nice Point Sets Can Have Nasty Delaunay Triangulations," 17th ACM Symposium Computational Geometry (2001), pp. 96-105.

Fortune, Steven, "Voronoi Diagrams and Delaunay Triangulations," Computing in Euclidean Geometry (1992), pp. 193-223, World Scientific Publ.

Gilbert, E.G., et al., "A Fast Procedure for Computing the Distance Between Complex Objects in Three-Dimensional Space," IEEE Journal of Robotics and Automation (Apr. 1988), vol. 4, No. 2, pp. 193-203.

Howarth, Richard J., "On Seeing Spatial Expressions," Representation and Processing of Spatial Expressions (1997), pp. 37-56, edited by Patrick Olivier and Klaus-Peter Gapp.

Lawrence, Craig, et al., "User's Guide for CFSQP Version 2.5: A C Code for Solving (Large Scale) Constrained Nonlinear (Minimax) Optimization Problems, Generating Iterates Satisfying All Inequality Constraints," Institute for Systems Research TR-94-16R1, University of Maryland, College Park (Apr. 1997).

McAllister, Michael, et al., "A Compact Piecewise-Linear Voronoi Diagram For Convex Sites in the Plane," IEEE Symposium on Foundations of Computer Science (1993), pp. 573-582.

Nayar, Shree K., et al., "Real-Time 100 Object Recognition System," Proc. Of IEEE International Conference on Robotics and Automation (1996), pp. 2321-2325.

Nygards Mikael, et al., "Three-Dimensional Periodic Voronoi Grain Models and Micromechanical FE-Simulations of a Two-Phase Steel," Computational Materials Science (2002), vol. 24, pp. 513-519.

Panier, Eliane R., et al., "On Combining Feasibility, Descent and Superlinear Convergence in Inequality Constrained Optimization," Mathematical Programming (1993), vol. 59, pp. 261-276.

Samet, H., "Spatial Data Structures," in Modern Database Systems, The Object Model, Interoperability and Beyond (1995) pp. 361-385, W. Kim, ed., ACM Press and Addison-Wesley.

Veltkamp, Remco C., et al., "State-of-the-Art in Shape Matching," Technical Report UU-CS-1999-27 (1999), pp. 1-26, Utrecht University, The Netherlands.

"Feasible Sequential Quadratic Programming," [online], Mar. 28, 1996 [retrieved on Jul. 24, 2002]. Retrieved from the Internet: <URL: http://www-fp.mcs.anl.gov/otc/Guide/OptWeb/Continuous/constrained/nonlin.

* cited by examiner

ENVIRONMENTAL REASONING USING GEOMETRIC DATA STRUCTURE

TECHNICAL FIELD

The present invention relates to representation of an environment using a geometric data structure and, more specifically, to representation and reasoning of an environment using Delaunay triangulation for use in robots.

BACKGROUND OF THE INVENTION

Robots typically execute instructions given to them by using a computer installed therein. One of the areas of research on robots that has drawn much attention recently involves making a robot intelligent so that it can understand and reason about the environment surrounding it and intelligently execute instructions given to it. In order to be intelligent and useful, robots should be able to understand and reason about the environment surrounding them on their own. With the capability to understand and reason about the environment, robots can act without detailed instructions and fill in missing details as required for achieving certain tasks.

For example, when the robot is given a verbal instruction "Get me the cup which is to the left of the computer," the robot needs to understand a variety of things. First, the robot should recognize the instruction using speech recognition techniques. Various techniques of speech recognition are known to one skilled in the art and, as such, a detailed description of the various techniques of speech recognition is not necessary for an understanding of the present invention. Second, the robot needs knowledge about spatial relations among objects in the environment (spatial data structure).

Equipped with knowledge about the spatial data structure, robots can perform various intelligent tasks given to them. For example, given the task to fetch the cup next to the computer, the robot can search objects in proximity to the computer and determine which cup is referred to in the task. As another example, when the robot sees a human raising a hand, the robot can utilize its understanding about spatial relations among objects to understand human intention. For example, if there are objects nearby the hand, the human may be raising the hand to get the object. If there are no objects near the human, the intention may be to show a gesture with the raised hand. As still another example, the robot can determine that the robot is in an office if the room has a computer on a table and a chair next to the table, as is usual for an office setting.

These examples involve performing a proximity query, in which an object is found that satisfies a particular spatial relation to another object given a viewpoint, direction and volume of interest (frustum). In order to perform such proximity queries essential to intelligent reasoning by robots, the robot is provided with a data structure for illustrating the objects in the environment and the spatial relations among them.

Conventional data structures such as k-d tree, quad-tree, or r-tree are not suitable for use by a robot in understanding the spatial relations among objects in the environment. A general illustration of k-d tree, quad-tree, and r-tree data structures can be found in Pankaj K. Agarwal and Jeff Erickson, "Geometric Range Searching and Its Relative," In B. Chazelle, J. E. Goodman, and R. Pollack, Editors, Advances in Discrete and Computational Geometry, Volume 23 of Contemporary Mathematics, pp. 1–56, American Mathematical Society Press, Providence, R.I., 1999. First, k-d tree or quad tree data structures do not support efficient sequential insertion and deletion, and r-tree data structures may generate a very unbalanced tree structure if the data arrives sequentially. Second, k-d tree and r-tree only support standard query volumes for the proximity query, such as boxes in three dimension ("3D") or rectangles in two dimension ("2D"). Thus, k-d tree and r-tree do not support a complex query volume such as the query volume the robot is currently viewing or has seen before, which may be in the shape of a cone or some other shape. Third, proximity search in k-d tree or r-tree is not fast enough when the number of objects is large. Finally, k-d trees or r-trees do not support efficient maintenance of the query result for a mobile robot.

Another conventional approach for storing information about spatial relations among objects in the environment used a multi-dimensional, symbolic array that depicted relative spatial (e.g., left of, or north of) and topological (e.g., adjacent to, or inside of) relations among objects in the environment. As such, one could determine relations of interest (e.g., in front of the desk, left of the bookcase, and the like). However, this representation was view-dependent, such that image transformation or viewer repositioning resulted in negation of some of the spatial and topological relations.

Therefore, there is a need for a data structure for storing spatial relations among objects in the environment that is not view-dependent. There is also a need for a data structure for storing spatial relations among objects in the environment that supports various types of query volumes for proximity queries. Additionally, there is also a need for a data structure for storing spatial relations among objects in the environment in which the proximity search is fast. Furthermore, there is a need for a data structure for storing spatial relations among objects in the environment that supports efficient sequential data insertion and deletion. Finally, there is also a need for a data structure that supports online building as new information is received.

SUMMARY OF INVENTION

To this end, the present invention uses a geometric data structure such as a Voronoi diagram or its counterpart Delaunay triangulation to store the spatial relations among objects in the environment. By using Voronoi diagrams or its counterpart Delaunay triangulation as the data structure for storing the spatial relations, sequential insertion and deletion of data becomes more efficient and various types of query volumes can be used for proximity query. Furthermore, the data structure is not view-dependent, and proximity queries can be carried out at a much faster speed compared with conventional data structures. In addition, the data structure can be updated to include new information as more information about existing objects is received or new objects are discovered.

The present invention provides a method of representing the spatial relation among objects in the environment using a Delaunay triangulation when the objects are represented in the form of simplified objects having a volume, such as cuboids. In one embodiment, the method receives image data corresponding to the environment and recognizes the objects in the image data, and updates the Delaunay triangulation such that the Delaunay triangulation is consistent with the recognized objects. Furthermore, a proximity query can be carried out using the Delaunay triangulation.

The method updates the Delaunay triangulation by creating a list of all objects of interest within a view of the environment at a particular time. Then, it is determined whether these objects of interest exist in the Delaunay triangulation. When it is determined that the object of interest exists in the Delaunay triangulation, the extent of the object of interest is updated and the Delaunay triangulation is updated to reflect such information. This is done by generating a suspect queue including Voronoi vertices incident to the object of interest and paired with the object of interest. When it is determined that the object of interest does not exist in the Delaunay triangulation, the method adds the object of interest to the Delaunay triangulation. This is done by finding one invalid Voronoi vertex in the Delaunay triangulation, and generating a suspect queue including Voronoi vertices incident to neighbor objects of the invalid Voronoi vertex and paired with the object of interest. These Voronoi vertices incident to the neighbor objects of the invalid Voronoi vertex are the ones that may have become invalid due to the addition of the new object. Then, the method determines whether the Voronoi vertices in the suspect queue are valid. The Delaunay triangulation is updated for each invalid Voronoi vertex in the suspect queue, thus keeping the Delaunay triangulation consistent for the entire environment.

DETAILED DESCRIPTION OF EMBODIMENTS

Figure 1:
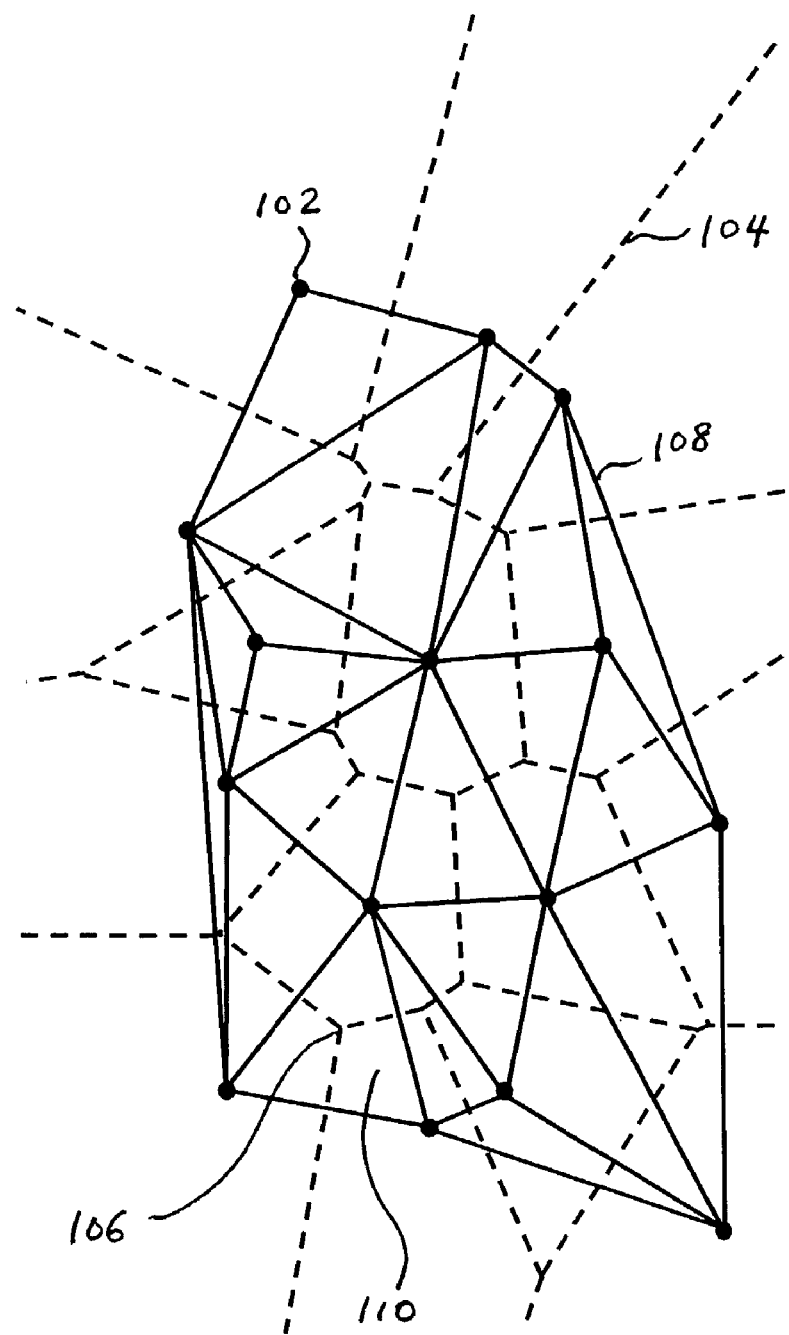
FIG. 1 is a sample Voronoi diagram and Delaunay triangulation in 2D.

The embodiments of the present invention will be described below with reference to the accompanying drawings. Like reference numerals are used for like elements in the accompanying drawings.

FIG. 1 is a sample Voronoi diagram and Delaunay triangulation in 2D. The concepts of Voronoi diagram and Delaunay triangulation are known in the art and have been used in areas such as models of crystal and cell growth, protein molecule volume analysis, selection and automatic movement of computer icons next likely to be used, analysis of animal territories, micromechanical modeling of material such as steel, and the like. However, Voronoi diagrams and Delaunay triangulations have not been used previously for storing the spatial relations among objects in the environment for robot's reasoning about the spatial relations.

Referring to FIG. 1, each of the plurality of points such as point 102 represents a site (object). The plurality of dotted lines such as dotted line 104 collectively constitute a Voronoi diagram, and each dotted line 104 is called a Voronoi edge. Although there are a plurality of dotted lines shown in FIG. 1, all of the dotted lines will be referred to using the reference numeral 104 for convenience of explanation. Each intersection 106 of the dotted lines 104 is called a Voronoi vertex. The Voronoi diagram has the property that for each site 102 every point in the region surrounding the site 102 and bounded by the Voronoi edges 104 and Voronoi vertices 106 is closer to that site 102 than to any other site. The Voronoi edges 104 are equidistant from two sites 102 and the Voronoi vertices 106 are equidistant from at least three sites 102.

The Delaunay triangulation is the geometric dual of the Voronoi diagram and is represented by the solid lines such as solid line 108 collectively. Each solid line 108 is called a Delaunay edge. Although there are a plurality of solid lines shown in FIG. 1, all the solid lines will be referred to using the reference numeral 108 for convenience of explanation. The Delaunay triangulation is defined as a triangulation of the sites 102 comprised of a plurality of triangles 110 bounded by the Delaunay edges 108. The Delaunay triangulation has the property that for each triangle 110 the circumcircle (not shown) of that triangle 110 does not contain any other site 102. The circumcircle is called a Voronoi circle, and the centers of such circumcircles correspond to the Voronoi vertices 106. An illustration of the Voronoi circles will be made below with reference to FIG. 4.

Figure 2:
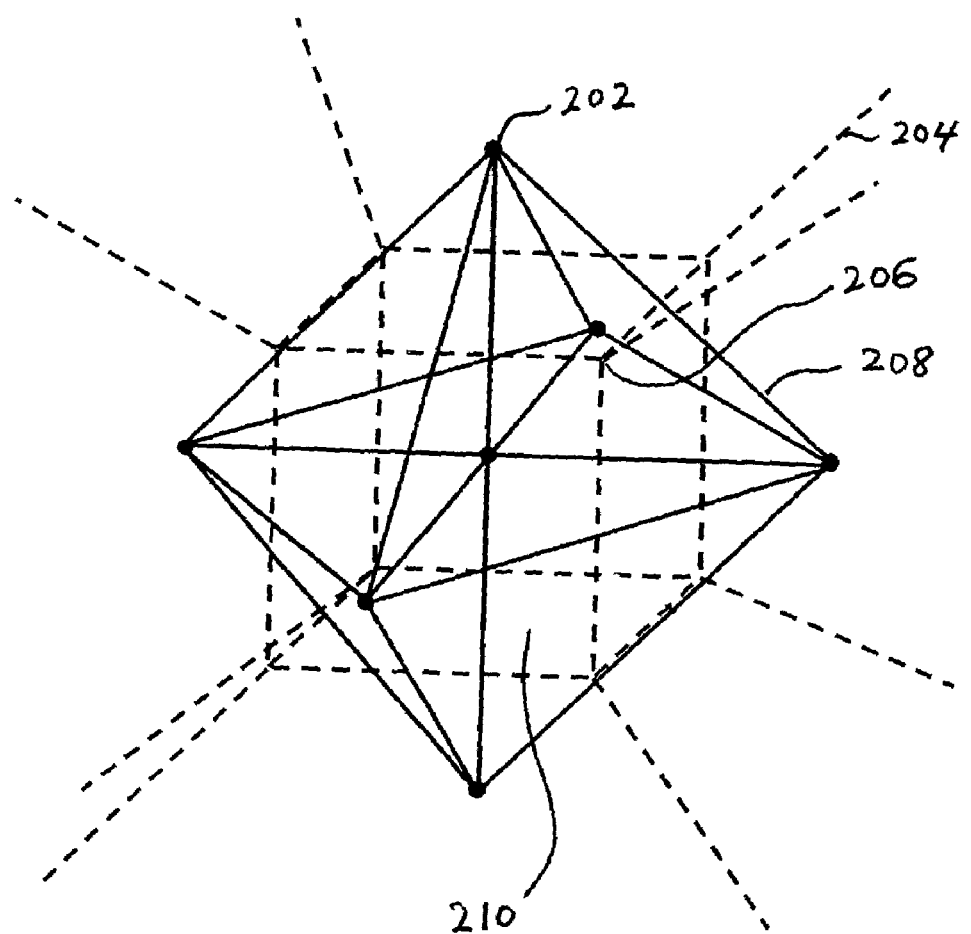
FIG. 2 is a sample Voronoi diagram and Delaunay triangulation in 3D.

FIG. 2 is a sample Voronoi diagram and Delaunay triangulation in 3D. Similar to 2D, the concepts of Voronoi diagram and Delaunay triangulation in 3D are known in the art. However, Voronoi diagrams and Delaunay triangulations in 3D were not used for storing the spatial relations among objects in the environment for robot's reasoning about them.

Referring to FIG. 2, each of the plurality of points such as point 202 represents a site (object) in 3D. The plurality of dotted lines such as dotted line 204 collectively constitute a Voronoi diagram in 3D, and each dotted line 204 is called a Voronoi edge. Although there are a plurality of dotted lines shown in FIG. 2, all of the dotted lines will be referred to using the reference numeral 204 for convenience of explanation. Each intersection 206 of the dotted lines 204 is called a Voronoi vertex. The Voronoi diagram has the property that for each site 202 every point in the region surrounding the site 202 and bounded by the Voronoi edges 204 and Voronoi vertices 206 is closer to that site 202 than to any other site. The Voronoi edges 204 are equidistant from three sites 202 in 3D and the Voronoi vertices 206 are equidistant from at least four sites 202 in 3D.

The Delaunay triangulation is the geometric dual of the Voronoi diagram in 3D and is represented by the solid lines such as solid line 208 collectively. Each solid line 208 is called a Delaunay edge. Although there are a plurality of solid lines shown in FIG. 2, all of the solid lines will be referred to with the reference numeral 208 for convenience of explanation. The Delaunay triangulation is defined as a triangulation of the sites 202 comprised of tetrahedrons 210 bounded by the Delaunay edges 208. The Delaunay triangulation has the property that for each tetrahedron 210 the circumspheres of that tetrahedron 210 does not contain any other site 202. The circumspheres are called Voronoi spheres and the centers of such Voronoi spheres correspond to the Voronoi vertices 206. An illustration of the Voronoi sphere will be made below in greater detail with reference to FIG. 4. Also, the Voronoi diagram and Delaunay triangulation in 3D will be explained in more detail below with reference to FIGS. 3 and 4.

Figure 3:
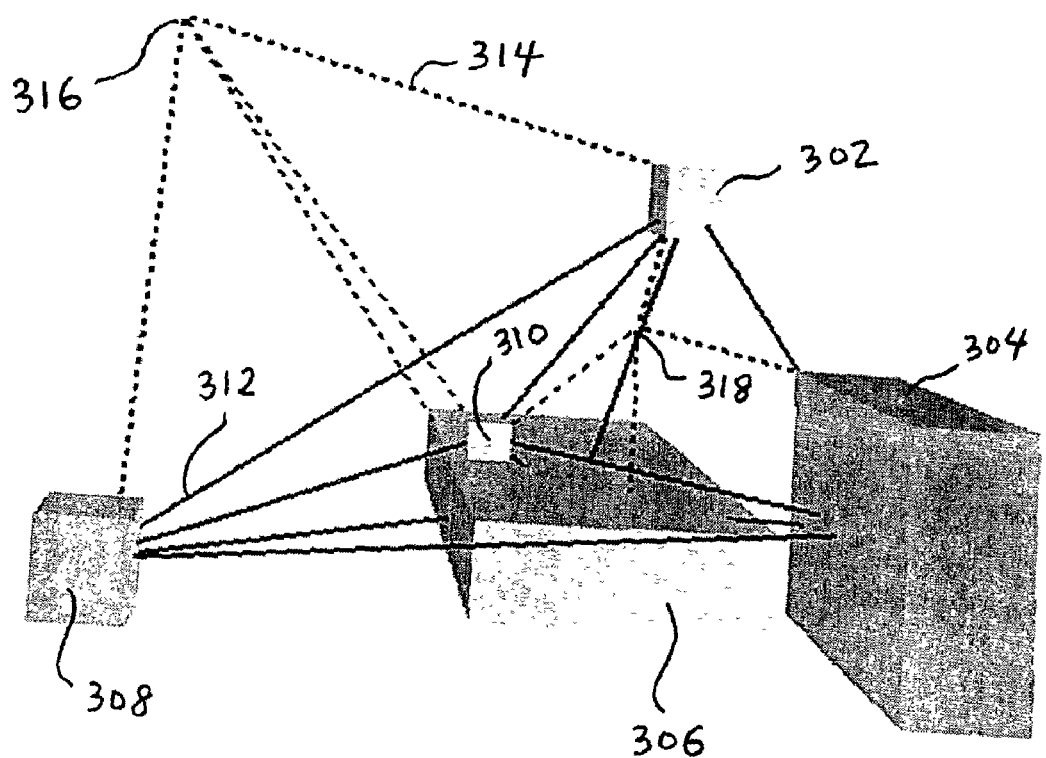
FIG. 3 is a diagram illustrating a Voronoi diagram and a Delaunay triangulation in 3D for real physical objects in the form of cuboids as used in the present invention.

FIG. 3 is a diagram illustrating the Voronoi diagram and Delaunay triangulation in 3D for real physical objects in the form of cuboids 302 used in the present invention. Since physical objects in the real environment are not point objects and have actual volume, the Voronoi diagrams and Delaunay triangulation have to be modified for use with physical objects.

In the present invention, the physical objects in the real world are represented in the form of cuboids 302, 304, 306, 308, and 310. For example, FIG. 3 maybe a representation of an office, where the cuboid 302 corresponds to a lamp, the cuboid 306 corresponds to a desk, the cuboid 310 corresponds to a book on the desk, the cuboid 308 corresponds to a bookcase, and the cuboid 304 corresponds to a chair. A cuboid is a simplified method of representing physical objects in the real world. The cuboid is defined as a bounding box in 3D with one axis perpendicular to the floor surface and its orientation adapted to minimize its volume but to fit all points of an object inside the cuboid. In other words, a cuboid is in the shape of a closed box comprised of three pairs of rectangular faces placed opposite each other and joined at right angles to each other. Each object in the real world can be modeled with a cuboid in the environment. The method itself of representing objects in the form of cuboids is known in the art and does not need to be described herein in detail for an understanding of present invention. However, representing the spatial relations among these cuboids using a Delaunay triangulation is not known in the art.

It should be noted that the present invention is not limited to cases in which objects in the real world are represented using cuboids. The objects in the real world can also be represented by any other type of object having a volume, such as spheres or a convex hull that more tightly approximates the extent of the object in 3D.

Referring to FIG. 3, the dotted lines 314 are the Voronoi edges and collectively constitute the Voronoi diagram corresponding to the cuboids 302, 304, 306, 308, and 310. The intersection 316 or 318 of at least four Voronoi edges (dotted lines) 314 corresponds to the Voronoi vertex. In a Voronoi diagram comprised of cuboids (instead of point objects) for representation of a real world environment according to the present invention, the Voronoi vertex corresponds to the center of a Voronoi sphere that is tangent to the surfaces of four cuboids. For example, the Voronoi vertex 316 corresponds to the center of a Voronoi sphere that is tangent to the surfaces of the cuboids 302, 306, 308, and 310. The distances from the Voronoi vertex 316 to the closest points on the surfaces of these cuboids 302, 306, 308, and 310 are same. Likewise, the Voronoi vertex 318 corresponds to the center of a Voronoi sphere that is tangent to the surfaces of the cuboids 302, 304, 306, and 310. The distances from the vertex 318 to the closest points on the surfaces of these cuboids 302, 304, 306, and 310 are same.

Figure 4:
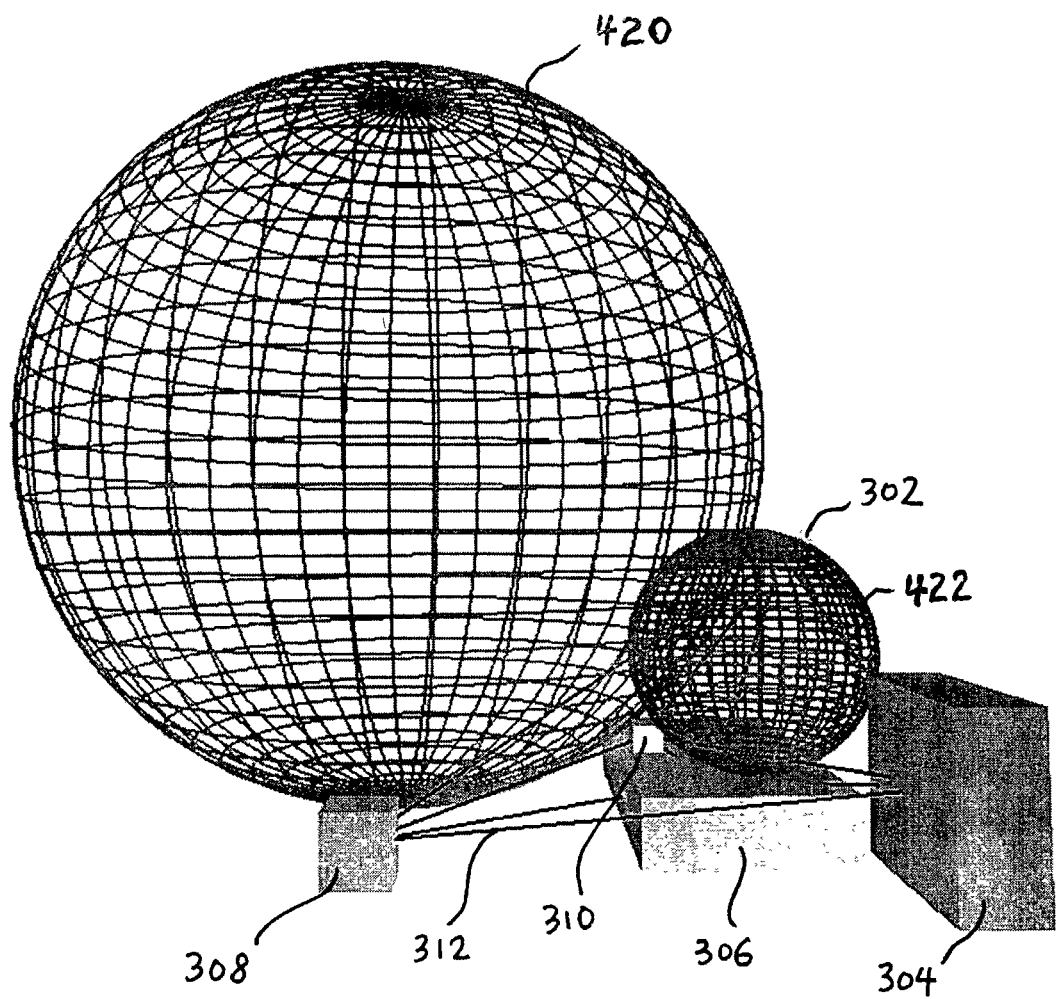
FIG. 4 is a diagram illustrating the Voronoi spheres and the Delaunay triangulation in 3D for real physical objects in the form of cuboids.

FIG. 4 is a diagram illustrating the Voronoi spheres and the Delaunay triangulation in 3D for real physical objects in the form of cuboids. FIG. 4 corresponds to FIG. 3 and shows the same cuboids 302, 304, 306, 308, and 310 as those shown in FIG. 3. FIG. 4 also shows the same Delaunay edges 312 as those shown in FIG. 3. FIG. 4 does not show the Voronoi edges 314, but instead shows Voronoi spheres 420 and 422 that correspond to the Voronoi vertices 316 and 318, respectively, shown in FIG. 3. Referring to FIG. 4, the Voronoi sphere 420 corresponds to the Voronoi vertex 316 of FIG. 3 and is tangent to the surfaces of four cuboids 302, 306, 308, and 310. Likewise, the Voronoi sphere 422 corresponds to the Voronoi vertex 318 of FIG. 3 and is tangent to the surfaces of four cuboids 302, 304, 306, and 310.

Figure 5:
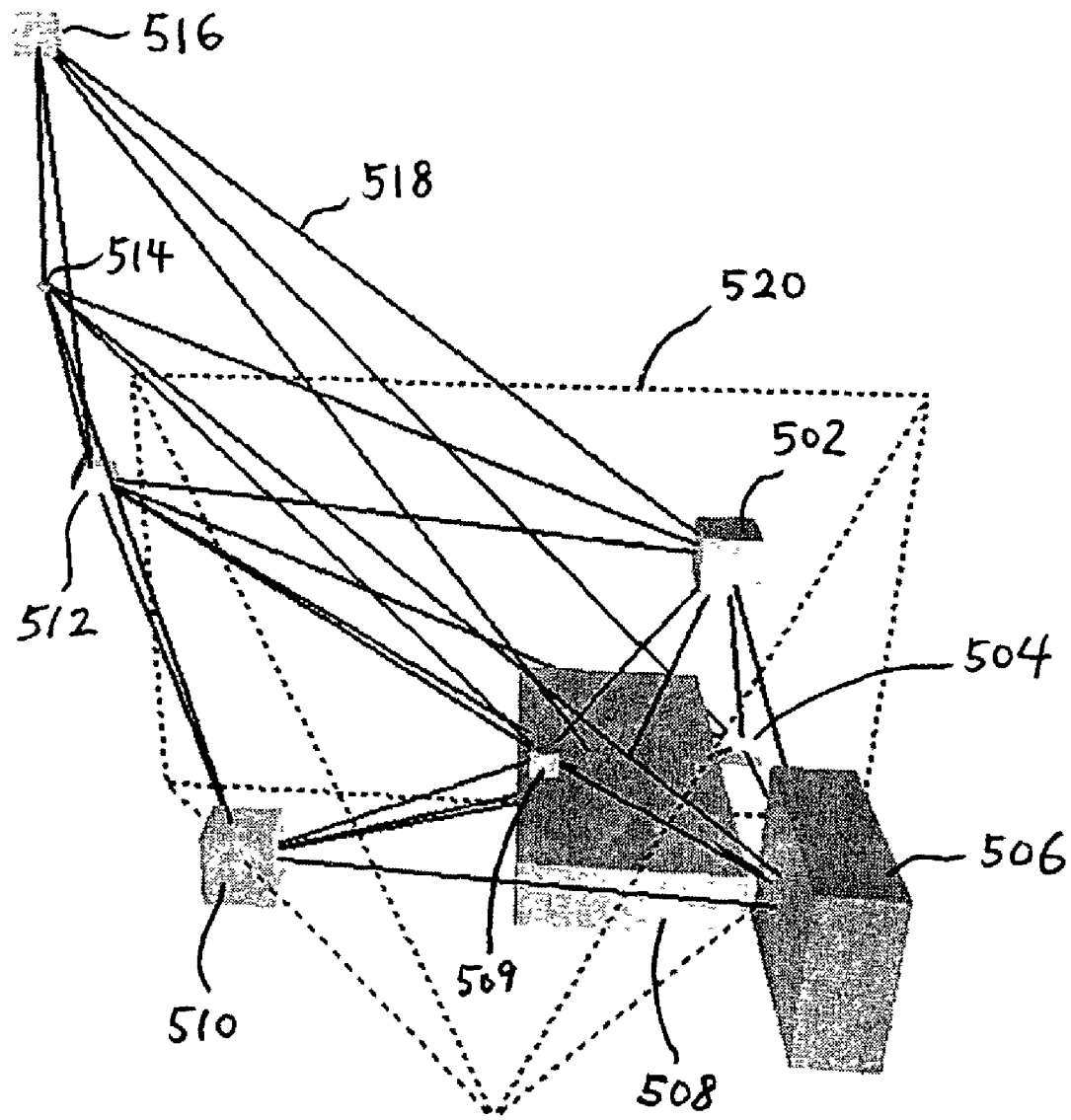
FIG. 5 is a diagram illustrating a sample Delaunay triangulation comprised of Delaunay edges corresponding to cuboids, and a view frustum.

FIG. 5 is a diagram illustrating a sample Delaunay triangulation comprised of Delaunay edges (solid lines) 518 corresponding to cuboids 502, 504, 506, 508, 509, 510, 512, 514, and 516, and a frustum 520. The frustum 520 is shown using dotted lines in a conical shape and represents the view of a robot having two stereo cameras as its eyes. FIG. 5 illustrates that the frustum 520 of a robot is smaller than the entire space of a real environment and thus the robot sees only part of the real world when it moves around. For example, the frustum 520 only includes the cuboids 502, 504, 506, 508, and 510, but does not include the cuboids 512, 514, and 516. Also, the arrangement of objects in the real world may change as time passes by. Therefore, the Voronoi diagram or the Delaunay triangulation representing the spatial relation among objects in the real environment needs to be updated as the robot moves around and changes its location or as time passes by.

Figure 6A:
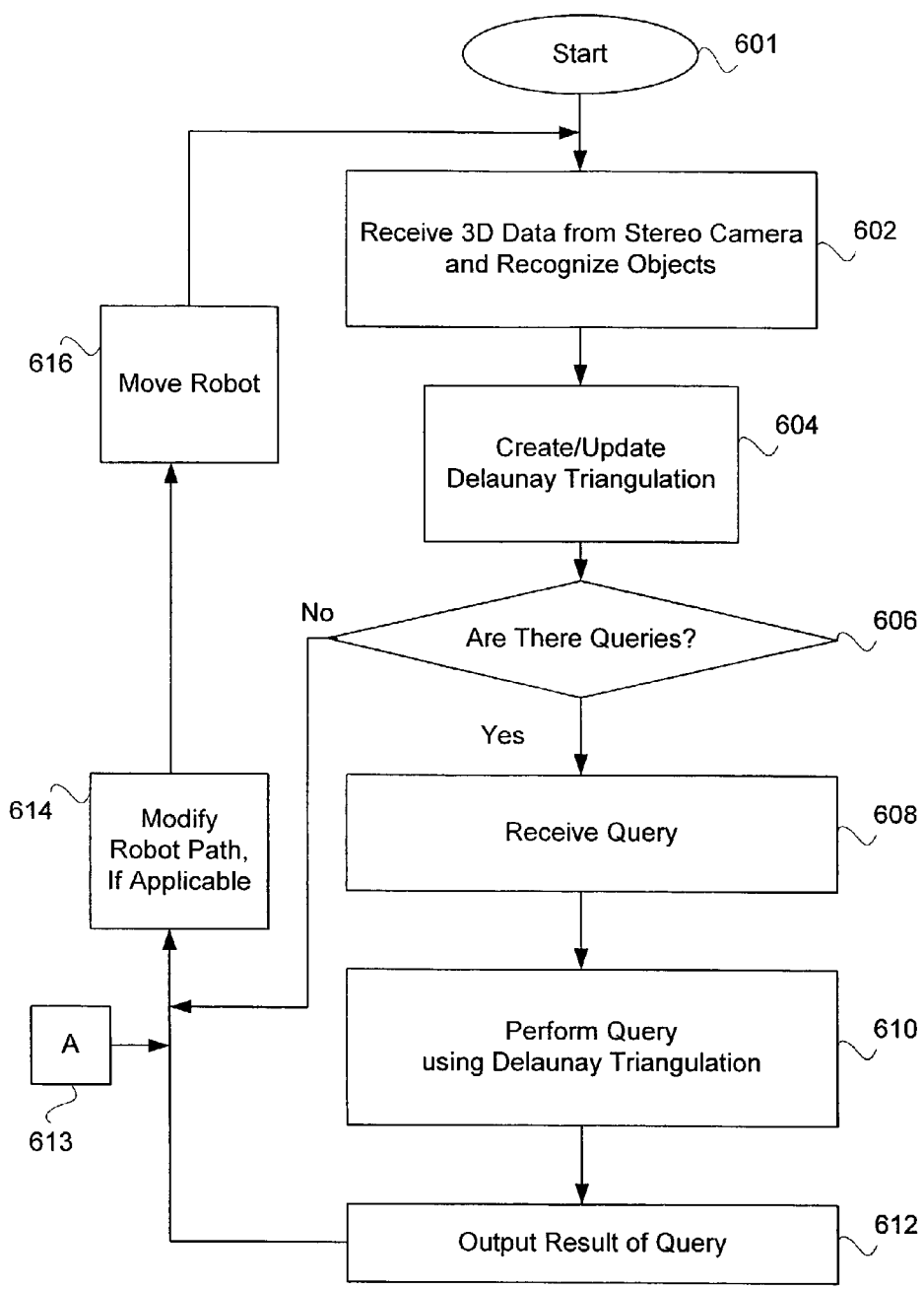
FIG. 6A is a flowchart illustrating the method of creating and updating the Delaunay triangulation and of performing proximity queries using the Delaunay triangulation according to one embodiment of the present invention.

FIG. 6A is a flowchart illustrating the method of creating and updating the Delaunay triangulation corresponding to the objects in the environment of interest to the robot and performing proximity queries using the Delaunay triangulation. The term "Delaunay triangulation" hereinbelow will be used interchangeably with the term "Voronoi diagram" since they are geometric duals of each other and are interchangeably used in the present invention. In fact, the present invention can generate the Delaunay triangulation without actually generating a Voronoi diagram but by merely utilizing the various concepts of Voronoi diagrams in manipulating various data structures in a computer.

It should also be noted that the Delaunay triangulation or Voronoi diagram of the present invention is generated, updated, stored, or utilized in a computer that controls a robot in the form of a database storing the various data associated with the Delaunay triangulation or Voronoi diagram. Therefore, an actual Delaunay triangulation or Voronoi diagram showing the actual shape of the various Delaunay or Voronoi edges may not be generated or shown in the computer. Rather, intermediate data that is used to perform operations corresponding to the Delaunay triangulation or Voronoi diagram are stored in the computer in the form of a database or in any other appropriate format.

Referring to FIG. 6A, the process starts 601 and the robot receives 602 three dimensional (3D) data from stereo cameras and recognizes the objects in the 3D data. The stereo camera can be any type of conventional video camera that outputs digital video data appropriate for use in computers. The stereo camera functions as the eye of the robot to receive visual information about the environment surrounding the robot. Recognizing objects in the environment involves identifying the object and its global coordinate in the space in which the robot is interested.

In one embodiment, the robot recognizes objects in the 3D data by using color segmentation and preprocessing. To this end, the color of images of the objects is represented in normalized coordinates to make a 2D color histogram of the scene. The color histogram of each individual object in the real world is projected onto this color histogram to find pixels that correspond to the object in the real world. The 3D coordinates corresponding to these pixels are computed using stereo computation, and all these 3D points are transformed to a global 3D coordinate system using the position and orientation of the stereo cameras. The above process is repeated for each 3D data frame that the robot receives. When a new frame of 3D data is received, the prior 3D data and the new 3D data are merged. In addition, the robot may perform noise elimination before it processes the 3D data and also perform re-sampling to make the density of 3D points uniform despite different sampling rates for the individual objects.

Although the robot recognizes objects in the 3D data in the manner described above, the above-described method of recognizing objects is not essential to the present invention and other methods of recognizing objects can be utilized consistent with the present invention. For example, objects can be identified by matching them with geometric models of various objects stored in a database.

Referring to FIG. 6A again, the robot creates and updates 604 the Delaunay triangulation to store the received 3D data in a geometric data structure that can be efficiently used by the robot in proximity queries. The method of creating or updating the Delaunay triangulation is described in greater detail below with reference to FIGS. 7–10.

After the Delaunay triangulation is created or updated 604, the robot determines 606 if there are any queries to be performed by the robot. The query may be an instruction input to the robot or may be an instruction necessitated by the robot itself to carry out other functions. If there is no query, the process goes to step 614 to modify the path of the robot's motion if it is necessitated by the updated Delaunay triangulation. If there is a query, the robot receives 608 the query and performs 610 the query using the created/updated Delaunay triangulation. The method of performing a proximity query as an example of a query is explained in detail below with reference to FIG. 11. Then, the robot outputs 612 the result of the query. The robot modifies 614 the path of its motion if it is necessitated by the updated Delaunay triangulation, and the robot moves 616 to receive 3D data in a different frustum in the environment to further update the Delaunay triangulation, if necessary. Step 614 (A) will be explained below with reference to FIG. 7.

Figure 6B:
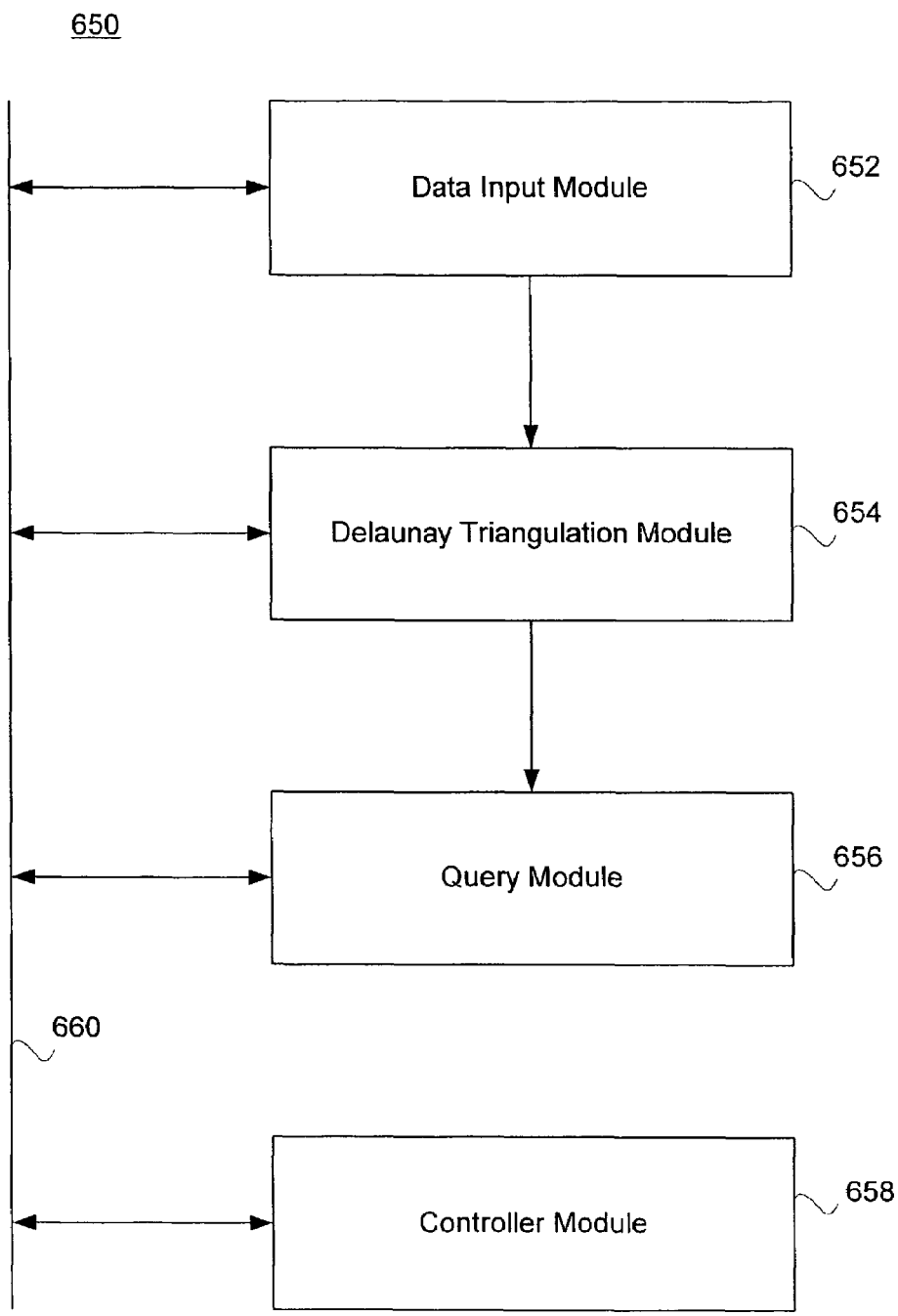
FIG. 6B is a block diagram of an environmental reasoning system according to one embodiment of the present invention.

FIG. 6B is a block diagram of an environmental reasoning system 650 according to one embodiment of the present invention. The environmental reasoning system 650 comprises a data input module 652, a Delaunay triangulation module 654, a query module 656, a controller module 658, and a control bus 660. The data input module 652 performs the functions of step 602 as explained with reference to FIG. 6A. That is, the data input module 652 receives 3D data about the environment and recognizes objects in the 3D data. The Delaunay triangulation module 654 creates and updates the Delaunay triangulation corresponding to the objects in the environment as explained for step 604 of FIG. 6A. The query module 656 carries out various queries as explained with respect to steps 606–612. The controller module 658 controls the operations of the data input module 652, the Delaunay triangulation module 654, and the query module 656 by providing appropriate control signals to these modules via the control bus 660. The controller module 658 may also control the operations of other modules (not shown) in the computer of the robot.

Figure 7:
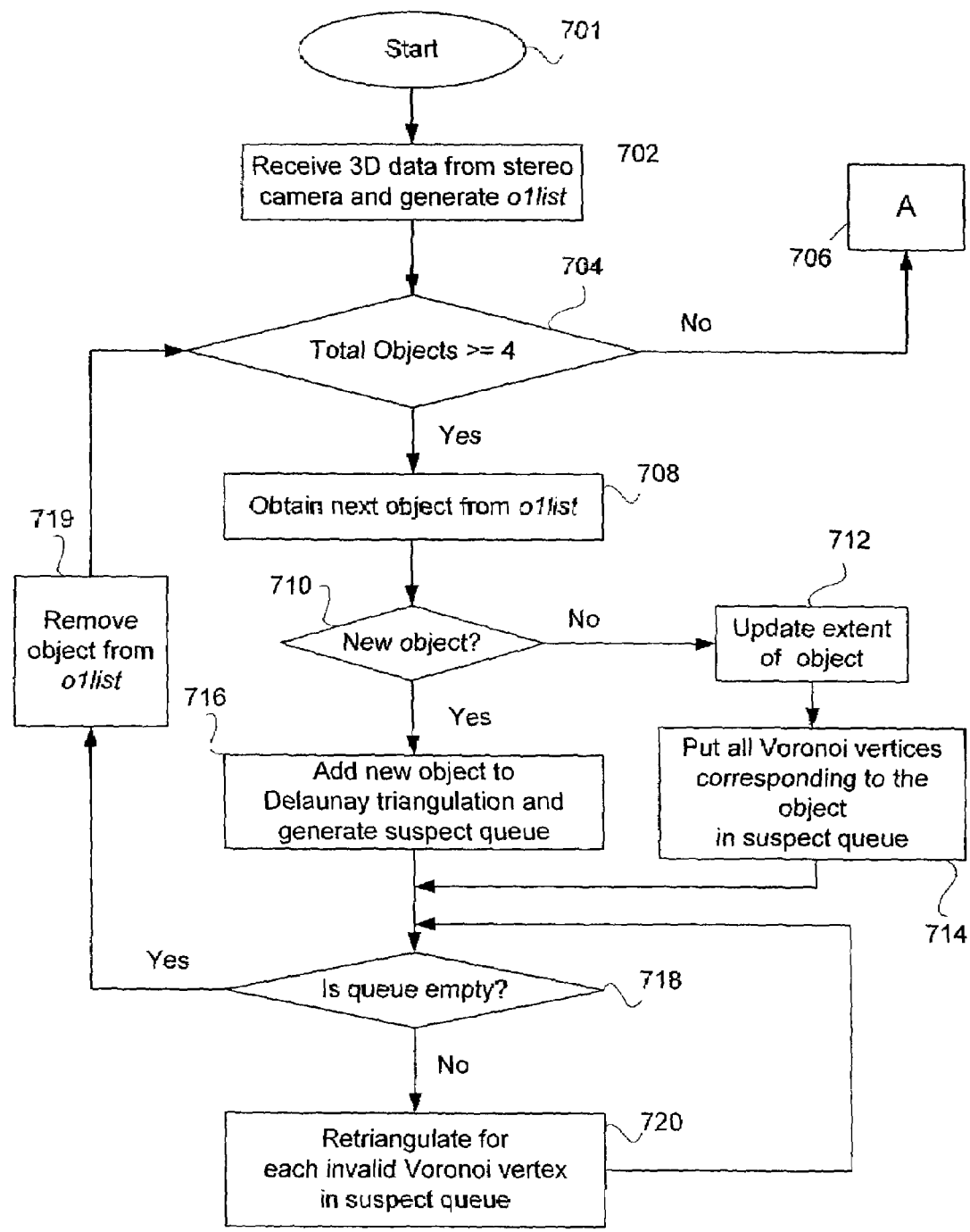
FIG. 7 is a flowchart illustrating the method of creating and updating the Delaunay triangulation in greater detail.

FIG. 7 is a flowchart illustrating a method of creating and updating 604 the Delaunay triangulation according to one embodiment of the present invention. As explained previously, the Delaunay triangulation is created, updated, stored, and utilized in the form of corresponding data in a database stored in the computer of the robot and, as such, the flowchart will explain how data corresponding to the Delaunay triangulation are created, manipulated, stored, and utilized in the computer. The various data are stored in the computer in appropriate forms of variables such as arrays or pointers or the like. The particular forms of variables used to store the data for the Delaunay triangulation are not essential to the present invention.

FIG. 7 will be explained using an example of a 3D space that has five objects $O_1$, $O_2$, $O_3$, $O_4$, and $O_5$ in the real environment. In addition, the computer of the robot assumes that there is always a default object $O_f$ having a coordinate in the infinity to facilitate computation of the Delaunay triangulation, according to an embodiment of the present invention. It is also assumed for convenience of explanation that the current Delaunay triangulation already has four objects $O_1$, $O_2$, $O_3$, $O_4$ but that object $O_5$ is not yet part of the Delaunay triangulation.

Referring to FIG. 7, the process starts 701 and the robot receives 702 3D data from the stereo camera and generates o1list at time $t_1$. o1list is a list storing all objects in the current view (frustum) of the robot. For purposes of illustration, it will be assumed that only $O_4$ and $O_5$ are in the frustum of the robot at time $t_1$. Accordingly, o1list will have $O_4$, and $O_5$ at time $t_1$. Then, it is determined 704 whether the total number of objects in the environment is not less than 4. The total number of objects includes the objects already stored in the Delaunay triangulation and any new objects in o1list as well. If the total number of objects is less than 4, then the process goes to step 706 (A), which corresponds to step 613 (A) in FIG. 6A. That is, the path of the robot is modified 614 if it is necessary and the robot is moved 706. Accordingly, the time reference is incremented to a later time $t_2$. If the total number of objects is not less than 4, the next object is obtained 708 from o1list. In the example used herein, the total number of objects is 6, which are $O_1$, $O_2$, $O_3$, $O_4$, $O_5$, and $O_f$. Thus, the number of objects is not less than 4, and the objects $O_4$ and $O_5$ in o1list will be obtained one by one in any appropriate order by the robot. For convenience of explanation, it is assumed that $O_4$ and $O_5$ are obtained from o1list in such order by the robot.

Then, it is determined 710 whether the object obtained from o1list is a new object. If it is a new object (such as $O_5$), then the new object is added 716 added to the Delaunay triangulation and a suspect queue is generated 716. The suspect queue is a queue that temporarily stores all possible Voronoi vertices of the Delaunay triangulation that may have become invalid (and thus may need to be updated) as a result of the addition of a new object, or change of location or the extent of an existing object in the environment. The suspect queue stores a list of suspect Voronoi vertices paired with an object against which the validity of such suspect Voronoi vertices should be checked. Step 716 will be explained in greater detail below with reference to FIG. 8. If it is not a new object (such as $O_4$), then the extent of the object is updated 712. That is, the size of the cuboid representing the object is updated. Then, all Voronoi vertices incident to the existing object (such as $O_4$) in the previous Delaunay triangulation are put 714 into the suspect queue and paired with the existing object to further evaluate whether any of those Voronoi vertices have become invalid. The contents of the suspect queue will be explained in greater detail with reference to FIG. 8.

Regardless of whether the object obtained from o1list is a new object, it is determined in step 718 whether the suspect queue is empty. If it is not empty, the Voronoi vertices in the suspect queue are checked for their validity against the object paired with them, and the Delaunay triangle is retriangulated 720 for each invalid Voronoi vertex found in the suspect queue by following a method similar to that as described in step 716. Step 720 will also be explained in greater detail below when explaining FIG. 8. If the suspect queue is empty, the object obtained in step 708 is removed 719 from o1list and the process returns to step 704 to repeat steps 708–718 for the next object found in o1list.

Figure 8:
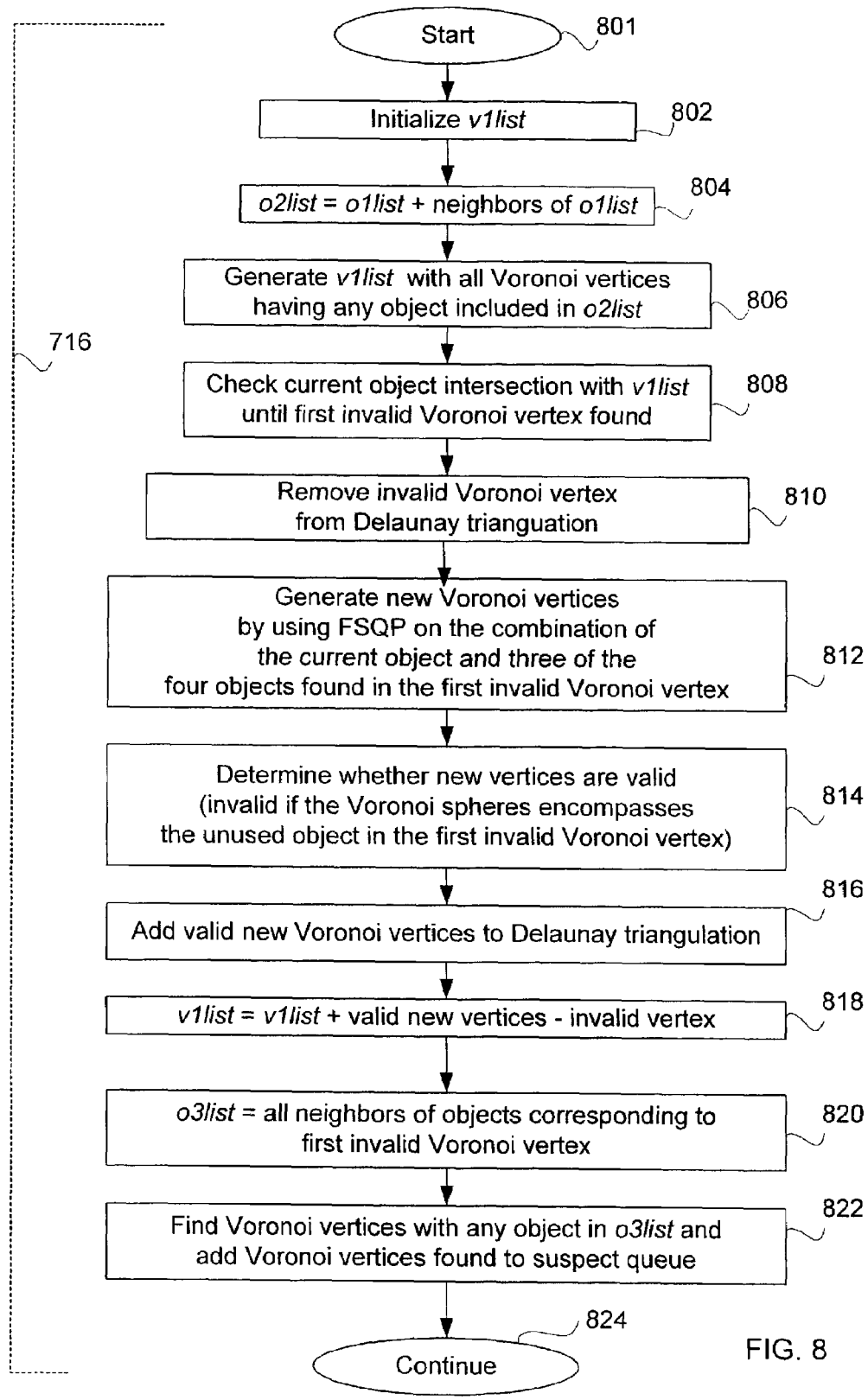
FIG. 8 is a flowchart illustrating the step of adding a new object to the Delaunay triangulation and generating a suspect queue as shown in FIG. 7 in greater detail.

FIG. 8 is a flowchart illustrating the step 716 of adding a new object to the Delaunay triangulation and generating a suspect queue as shown in FIG. 7 in greater detail. Steps 801–824 illustrated in FIG. 8 collectively correspond to step 716 in FIG. 7. As explained with respect to FIG. 7, steps 801–824 (or step 716) come into play when the object found in o1list is a new object.

Referring to FIG. 8, the process starts 801 and first initializes 802 v1list by resetting it to null. Then, o2list is generated 804 by adding o1list and the neighbors of all objects found in o1list. The neighbors of an object can be found by reaching the closest object when following the Delaunay edges in a Delaunay triangulation. In the above example where the previous Delaunay triangulation corresponded to an environment that had four real objects $O_1$, $O_2$, $O_3$, and $O_4$, an object $O_f$ in infinity for use by the computer, and a new object is added $O_5$, o2list becomes:

$$o2list = o1list(O_4 \text{ and } O_5) + \text{neighbors of } o1list(O_1, O_2, O_3, O_f)$$

$$= \{O_1, O_2, O_3, O_4, O_5, O_f\}$$

Then, v1list is generated 806 as a list of all Voronoi vertices corresponding to any object included in o2list. Thus, in the above example v1list is:

v1list=$\{V_{f1}, V_{f2}, V_{f3}, V_{f4}, V_{f5}\}$, where $V_{f1}$ is the Voronoi vertex corresponding to objects $\{O_f, O_2, O_3, O_4\}$, $V_{f2}$ is the Voronoi vertex corresponding to objects $\{O_1, O_f, O_3, O_4\}$, $V_{f3}$ is the Voronoi vertex corresponding to objects $\{O_1, O_2, O_f, O_4\}$, $V_{f4}$ is the Voronoi vertex corresponding to objects $\{O_1, O_2, O_3, O_f\}$, and $V_{f5}$ is the Voronoi vertex corresponding to objects $\{O_1, O_2, O_3, O_4\}$ Since $O_5$ is a new object, there is no Voronoi vertex corresponding to any set of four objects including the new object $O_5$.

Then, the new object $O_5$ is checked 808 against the Voronoi vertices found in v1list to find the first invalid Voronoi vertex. A Voronoi vertex is invalid when the Voronoi sphere corresponding to the Voronoi vertex encompasses any other object. If, for example, the Voronoi sphere corresponding to the Voronoi vertex $V_{f5}$ encompasses the new object $O_5$, then $V_{f5}$ is an invalid Voronoi vertex. When the first invalid Voronoi vertex is found, the process does not need to look for any other invalid Voronoi vertex as the remaining invalid Voronoi vertices can be found from this seed. The first invalid Voronoi vertex $V_{f5}$ is removed 810 from the existing Delaunay triangulation, since it is no longer a valid Voronoi vertex appropriately representing spatial relation among the objects in the environment. Then, new Voronoi vertices are generated 812 for various sets of four objects obtained by combining the new object ($O_5$ in the example used herein) and any three of the four objects ($O_1$, $O_2$, $O_3$, $O_4$ in the example herein) found in the first invalid Voronoi vertex ($V_{f5}$ in the example used herein). Therefore, in the example used herein, new Voronoi vertices $V_1$, $V_2$, $V_3$, and $V_4$ are generated for the following sets of four objects: $V_1$: $\{O_5, O_2, O_3, O_4\}$, $V_2$: $\{O_1, O_5, O_3, O_4\}$, $V_3$: $\{O_1, O_2, O_5, O_4\}$, and $V_4$: $\{O_1, O_2, O_3, O_5\}$.

The Voronoi vertices for these sets of objects are generated using an optimization algorithm called Feasible Sequential Quadratic Programming ("FSQP"). FSQP is an optimization algorithm and in the present invention uses the gradient descent to iteratively find the values of the location and radius of the Voronoi sphere that satisfies the constraints of being tangent to the set of objects. FSQP is well-known to one skilled in the art and a detailed description of the FSQP algorithm itself is not necessary for an understanding of the present invention. A more detailed explanation of FSQP can be found in Eliane R. Panier and Andre L. Tits, "On Combining Feasibility, Descent and Superlinear Convergence in Inequality Constrained Optimization," Mathematical Programming, Vol. 59 (1993), pp. 261–276.

Then, it is determined 814 whether any of the newly generated Voronoi vertices are invalid. Here, the newly generated Voronoi vertices ($V_1$, $V_2$, $V_3$, and $V_4$ in the example herein) are checked to determine if the Voronoi spheres corresponding to these vertices intersect with or encompass any of the objects in the first invalid Voronoi vertex that were not used for generating the Voronoi vertices. The newly generated Voronoi vertices are valid when they do not intersect or encompass any of the objects in the first invalid Voronoi vertex ($V_{f5}$ in the example used herein) that were not used for generating the Voronoi vertices. Thus, in the example used herein, $V_1$ is checked to determine if the Voronoi sphere corresponding to $V_1$ intersects or encompasses object $O_1$. $V_2$ is checked to determine if the Voronoi sphere corresponding to $V_2$ intersects or encompasses object $O_2$. $V_3$ is checked to determine if the Voronoi sphere corresponding to $V_3$ intersects or encompasses object $O_3$. $V_4$ is checked to determine if the Voronoi sphere corresponding to $V_4$ intersects or encompasses object $O_4$. Then, only the valid newly generated Voronoi vertices are added 816 to the Delaunay triangulation. For example, if $V_2$ and $V_3$ are the valid newly generated Voronoi vertices, then $V_2$ and $V_3$ are added to the existing Delaunay triangulation to reflect the addition of the new object $O_5$. The above process is referred to as retriangulation of the void space.

Then, v1list is updated 818 such that:

v1list=v1list+valid newly generated Voronoi vertices−first invalid Voronoi vertex.

In the example herein, v1list=$\{V_{f1}, V_{f2}, V_{f3}, V_{f4}, V_{f5}\}+\{V_2, V_3\}-\{V_{f5}\}=\{V_{f1}, V_{f2}, V_{f3}, V_{f4}, V_2, V_3\}$. At this point, v1list includes vertices corresponding to the new object $O_5$. Thereafter, all the neighbors of the objects corresponding to the first invalid Voronoi vertex are put 820 into o3list. In the example used herein, the neighbor of the objects $\{O_1, O_2, O_3, O_4\}$ in $V_{f5}$ is $\{O_f\}$, so o3list is comprised of only $\{O_f\}$.

Thereafter, any Voronoi vertex corresponding to any object included in o3list is found and added 822 to a suspect queue and is paired with the new object. In the example herein, any Voronoi vertex that corresponds to $\{O_f\}$, i.e., $V_{f1}$, $V_{f2}$, $V_{f3}$, and $V_{f4}$ are added to the suspect queue and paired with the new object $\{O_5\}$. Therefore, the suspect queue in the example herein includes four pairs of a suspect Voronoi vertex and the new object, i.e., $\{V_{f1}, O_5\}$, $\{V_{f2}, O_5\}$, $\{V_{f3}, O_5\}$, and $\{V_{f4}, O_5\}$. Also, to further explain step 714 in FIG. 7, if $O_4$ were the object whose extents were updated 712, the suspect queue in step 714 in the example herein would comprise the following pairs, $\{V_{f1}, O_4\}$, $\{V_{f2}, O_4\}$, $\{V_{f3}, O_4\}$, and $\{V_{f5}, O_4\}$.

Then, the process continues 824 and, as explained with reference to FIG. 7, the Voronoi vertex in each pair of the suspect queue is checked against the paired object ($O_4$ or $O_5$ in the example herein) to determine 720 if it is valid. It is valid if the Voronoi sphere corresponding to the Voronoi vertex does not encompass the paired object. The invalid Voronoi vertices are retriangulated 720 by following the same steps as described in steps 810–816, except that (i) in step 812 the newly generated Voronoi vertices are Voronoi vertices included in the suspect queue and that (ii) in step 814 the validity of the Voronoi vertices are checked by determining if they intersect with their paired objects in the suspect queue.

Figure 9:
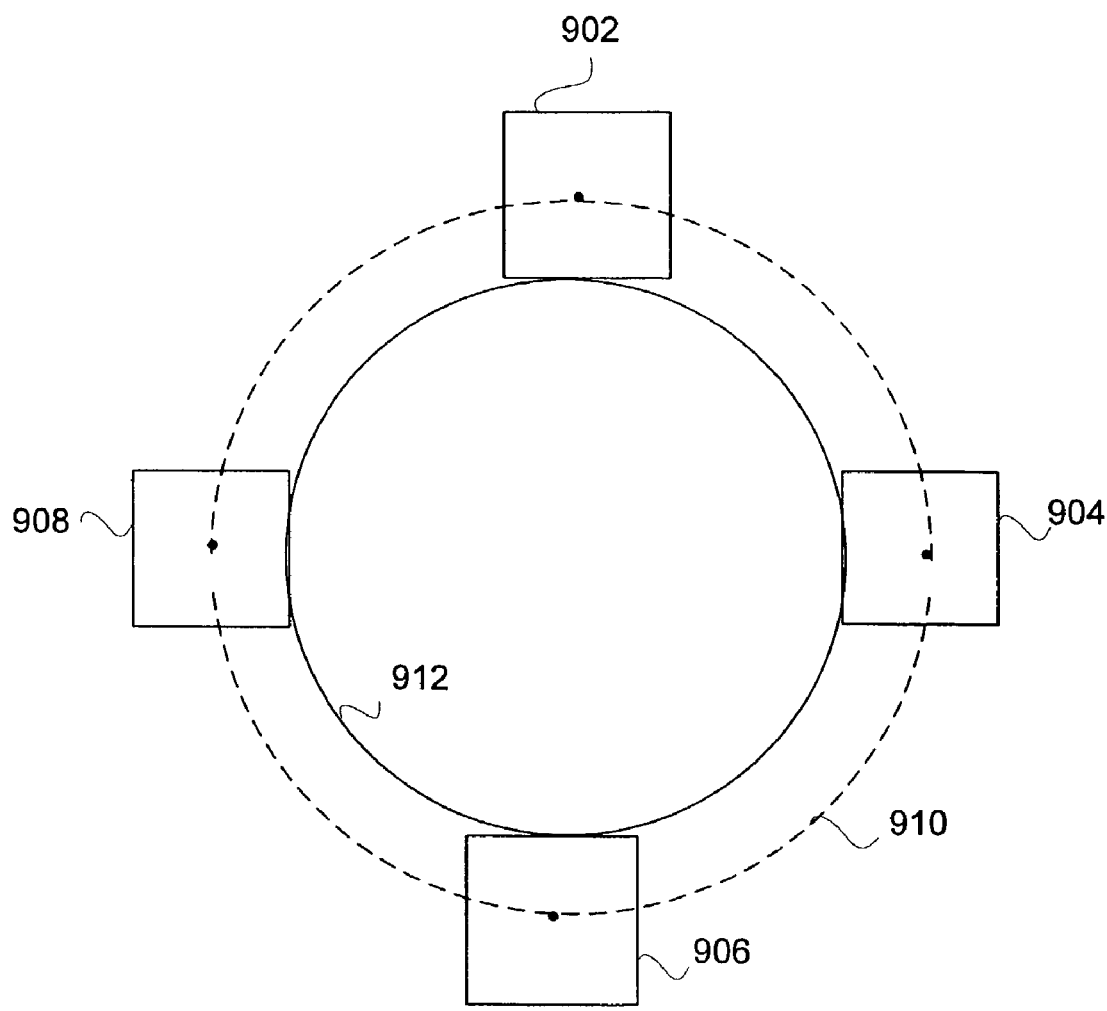
FIG. 9 is a diagram illustrating a method of generating a Voronoi sphere touching the surfaces of four cuboids using Feasible Sequential Quadratic Programming ("FSQP") according to one embodiment of the present invention.

FIG. 9 is a diagram illustrating the method of generating a Voronoi sphere tangent to the surfaces of four cuboids using FSQP according to one embodiment of the present invention. FIG. 9 shows four cuboids 902, 904, 906, and 908, an initial sphere 910 and a Voronoi sphere 912 generated by FSQP. Although the cuboids 902, 904, 906, and 908, the initial sphere 910, and the Voronoi sphere 912 are shown in a two dimensional diagram for convenience of explanation, it should be noted that all the cuboids 902, 904, 906, and 908, the initial sphere 910 and the Voronoi sphere 912 have a certain depth in a direction perpendicular to the surface of the drawing such that they are real physical objects in 3D.

Referring to FIG. 9, the initial sphere 910 is obtained by generating a sphere that passes through the centers of the cuboids 902, 904, 906, and 908. The initial sphere 910 will serve as the initial guess for the FSQP algorithm in finding the Voronoi sphere 912 that is tangent to the surfaces of the cuboids 902, 904, 906, and 908. That is, the FSQP algorithm uses the initial sphere 910 as the initial guess and searches for an optimal Voronoi sphere that is tangent to the surfaces of the cuboids 902, 904, 906, and 908. As stated previously, the FSQP algorithm itself is well known to one skilled in the art.

Figure 10:
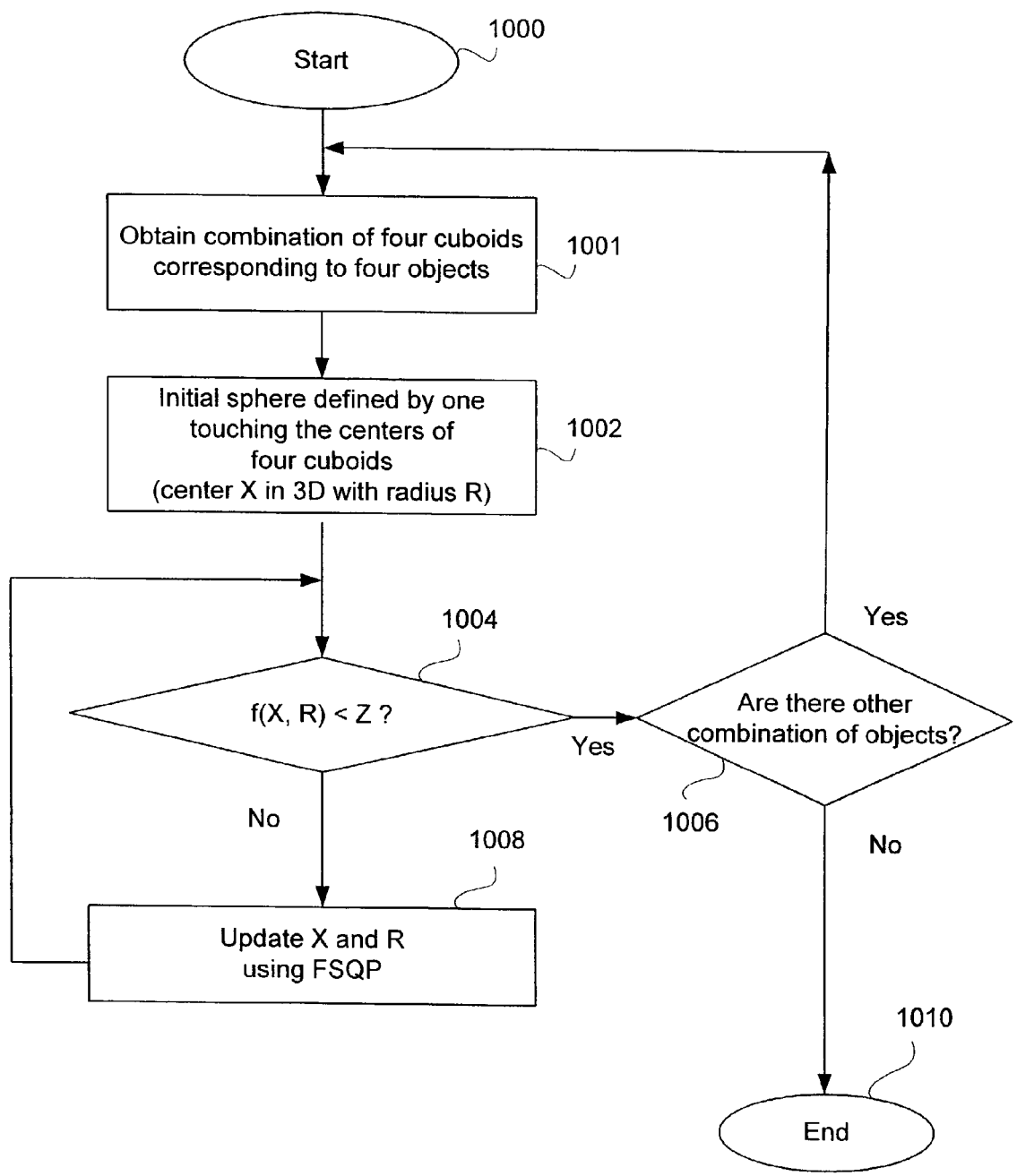
FIG. 10 is a flowchart illustrating the method of generating a Voronoi sphere that touches the surfaces of four cuboids using the FSQP algorithm.

FIG. 10 is a flowchart illustrating the method of generating a Voronoi sphere that is tangent to the surfaces of four cuboids using the FSQP algorithm. FIG. 10 corresponds to step 812 in FIG. 8. First, as the process starts 1000, the combination of four cuboids corresponding to four objects is obtained 1001 as described in step 812 of FIG. 8. An initial sphere is generated 1002 with a sphere defined by the centers of four cuboids. The center of the sphere initially guessed will have a coordinate X in 3D with a radius R. Then, it is determined 1004 whether $f(X,R)<Z$, where $$f(X, R) = \sum_{i=1}^{4} (\delta(X, P_i) - R)^2,$$

$\delta(X,P_i)$ is the shortest distance to the sphere ($P_i$ being the point on the sphere closest to the center X), and Z is a predetermined tolerance. According to one embodiment of the present invention, the tolerance Z is 0.001 m². If $f(X, R)$ is less than the tolerance Z, then it is determined 1006 whether there are other combinations of objects for which an optimum sphere needs to be found. If there are no other combinations of objects, the process ends 1010 and the results are returned since the optimal Voronoi sphere has been found for every combination of objects. If $f(X, R)$ is not less than Z, then the coordinate X and the radius R of the Voronoi sphere are updated using the FSQP algorithm and the process repeats steps 1004 and 1008 until an optimum Voronoi sphere has been found.

Figure 11:
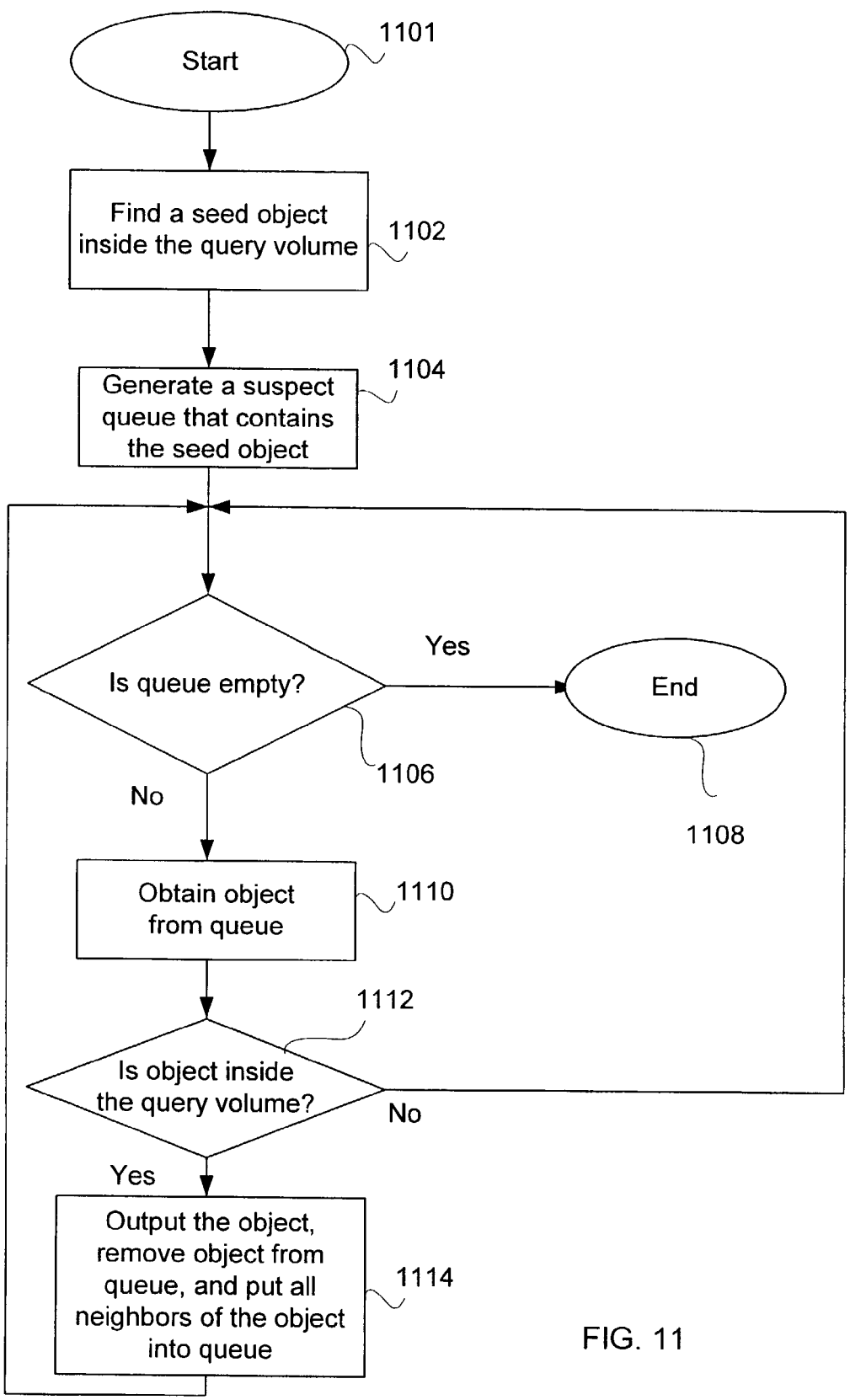
FIG. 11 is a flowchart illustrating the method of performing proximity queries as an example of the robot's using the spatial data in the Delaunay triangulation.

FIG. 11 is a flowchart illustrating the method of performing proximity queries as an example of the robot's using the spatial data in the Delaunay triangulation. FIG. 11 corresponds to step 610 of FIG. 6A when the query is a proximity query. First, the process starts 1101 and the robot finds 1102 a seed object inside the query volume. The query volume is a volume in which the robot is interested, and the seed object can be any object found in the query volume. For example, when the robot receives the instruction, "Get me the cup to the left of the computer in the study" then the robot may use the computer as the seed object and try to find the cup using the Delaunay triangulation storing the spatial relation among objects. Thus, the robot first finds 1102 the seed object (computer) in the query volume (study). After the seed object is found 1102, a suspect queue that contains the seed object is generated 1104. Once the queue is generated, it is determined 1106 whether the queue is empty. If it is empty, the process ends 1108. If the queue is not empty, then the object is obtained 1110 from the queue and it is determined 1112 whether the obtained object is inside the query volume. It if is not in the query volume, the process returns to step 1106 to work with the next object in the queue. If it is in the query volume, then the object is output as one of the objects that is proximate to the seed object and is removed from the queue. In addition, all the neighbors of the object are added to the suspect queue to determine other neighbors. The neighbors of the object can be found by following the Delaunay edges in the Delaunay triangulation until the neighbor is found. It should be noted that the this process is also carried out using data corresponding to the Delaunay triangulation in a computer and that there will be no actual line to follow. Thereafter, the process returns to step 1106 to repeat the steps of 1106–1114 until the queue becomes empty. When the process ends 1108, all the proximate objects in the current view are output. Thus, it is possible to examine whether the object to find (e.g., cup) exists in the list. If the proximate objects include more than one cup, for example, it is also possible to determine which cup is referred to by examining the spatial relationship between the computer and each of the cups.

Although the present invention has been illustrated as a method and system for environmental reasoning using geometric data structures, it should be clear to one skilled in the art that the method or system of the present invention can be embodied in a computer program product recorded on any type of computer readable medium.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of representing for an observer a spatial relation among objects in an environment in the form of data corresponding to a Delaunay triangulation, the objects being represented by corresponding simplified objects having a volume, the method comprising:
receiving image data corresponding to the environment;
recognizing the objects in the image data;
determining whether Voronoi vertices corresponding to an object of interest are valid; and
updating the Delaunay triangulation for each invalid Voronoi vertex after motion relative to the environment, such that the Delaunay triangulation is consistent with the recognized objects, the motion relative to the environment caused by at least one of observer motion, addition of a new object to the environment, change of location of an existing object, or change of extent of an existing object.

2. The method of claim 1, wherein the simplified objects are cuboids.

3. The method of claim 1, further comprising carrying out a proximity query using the Delaunay triangulation.

4. The method of claim 3, wherein carrying out a proximity query comprises:
selecting an initial object inside a query volume in the environment;
generating a suspect queue containing neighbor objects of the initial object in the Delaunay triangulation;
determining whether each of the neighbor objects is inside the query volume; and
responsive to determining that the neighbor object is inside the query volume, determining that the neighbor object is proximate to the initial object.

5. The method of claim 1, wherein receiving image data comprises receiving data that corresponds to a three-dimensional representation of the environment from a stereo camera.

6. The method of claim 1, wherein recognizing the objects in the image data comprises:
generating a first color histogram of the image data;
comparing the first color histogram with a second color histogram corresponding to known objects; and
determining that the known object exists in the environment when the second color histogram matches a part of the first color histogram.

7. The method of claim 1, wherein determining whether Voronoi vertices corresponding to an object of interest are valid comprises:
creating an object list including all objects of interest within a view of the environment;
determining whether each of the objects of interest exists in the Delaunay triangulation;
responsive to determining that the object of interest exists in the Delaunay triangulation, updating the extent of the object of interest and generating a suspect queue, the suspect queue including the Voronoi vertices corresponding to the object of interest and the Voronoi vertices being paired with the object of interest; and determining whether the Voronoi vertices in the suspect queue are valid.

8. The method of claim 7, wherein determining whether the Voronoi vertices in the suspect queue are valid comprises determining whether Voronoi spheres corresponding to the Voronoi vertices in the suspect queue include the paired object of interest.

9. The method of claim 7, wherein updating the Delaunay triangulation comprises:

removing an invalid Voronoi vertex from the Delaunay triangulation;

generating new Voronoi vertices corresponding to four objects corresponding to the invalid Voronoi vertex;

determining whether the new Voronoi vertices are valid; and responsive to determining that the new Voronoi vertices are valid, adding the new Voronoi vertices to the Delaunay triangulation.

10. The method of claim 9, wherein determining whether the new Voronoi vertices are valid comprises determining whether Voronoi spheres corresponding to the new Voronoi vertices include the paired object of interest.

11. The method of claim 9, wherein the new Voronoi vertices are generated by using a feasible sequential quadratic programming algorithm such that the new Voronoi vertices are tangent to the surfaces of the four objects.

12. The method of claim 1, wherein determining whether Voronoi vertices corresponding to an object of interest are valid comprises:

creating an object list including all objects of interest within a view of the environment;

determining whether each of the objects of interest exists in the Delaunay triangulation;

responsive to determining that the object of interest does not exist in the Delaunay triangulation, adding the object of interest to the Delaunay triangulation, determining one invalid Voronoi vertex in the Delaunay triangulation, and generating a suspect queue, the suspect queue including Voronoi vertices corresponding to neighbor objects of the invalid Voronoi vertex and the Voronoi vertices being paired with the object of interest; and determining whether the Voronoi vertices in the suspect queue are valid.

13. The method of claim 12, wherein determining whether the Voronoi vertices in the suspect queue are valid comprises determining whether Voronoi spheres corresponding to the Voronoi vertices in the suspect queue include the paired object of interest.

14. The method of claim 12, wherein updating the Delaunay triangulation comprises:

removing the invalid Voronoi vertex from the Delaunay triangulation;

generating new Voronoi vertices corresponding to four objects corresponding to the invalid Voronoi vertex;

determining whether the new Voronoi vertices are valid; and responsive to determining that the new Voronoi vertices are valid, adding the new Voronoi vertices to the Delaunay triangulation.

15. The method of claim 14, wherein determining whether the new Voronoi vertices are valid comprises determining whether Voronoi spheres corresponding to the new Voronoi vertices include the paired object.

16. The method of claim 14, wherein the new Voronoi vertices are generated by using a feasible sequential quadratic programming algorithm such that the new Voronoi vertices are tangent to the surfaces of the four objects.

17. A computer program product for representing for an observer a spatial relation among objects in an environment in the form of a Delaunay triangulation, the objects being represented by corresponding simplified objects having a volume, the computer program product stored on a computer readable medium and adapted to perform a method comprising:

receiving image data corresponding to the environment;

recognizing the objects in the image data;

determining whether Voronoi vertices corresponding to an object of interest are valid; and updating the Delaunay triangulation for each invalid Voronoi vertex after motion relative to the environment, such that the Delaunay triangulation is consistent with the recognized objects, the motion relative to the environment caused by at least one of observer motion, addition of a new object to the environment, change of location of an existing object, or change of extent of an existing object.

18. The computer program product of claim 17, wherein the simplified objects are cuboids.

19. The computer program product of claim 17, further comprising carrying out a proximity query using the Delaunay triangulation.

20. The computer program product of claim 19, wherein carrying out a proximity query comprises:

selecting an initial object inside a query volume in the environment;

generating a suspect queue containing neighbor objects of the initial object in the Delaunay triangulation;

determining whether each neighbor object is inside the query volume; and responsive to determining that the neighbor object is inside the query volume, determining that the neighbor object is proximate to the initial object.

21. The computer program product of claim 17, wherein receiving image data comprises receiving data that corresponds to a three-dimensional representation of the environment from a stereo camera.

22. The computer program product of claim 17, wherein recognizing the objects in the image data comprises:

generating a first color histogram of the image data;

comparing the first color histogram with a second color histogram corresponding to known objects; and determining that the known object exists in the environment when the second color histogram matches a part of the first color histogram.

23. The computer program product of claim 17, wherein determining whether Voronoi vertices corresponding to an object of interest are valid comprises:

creating an object list including all objects of interest within a view of the environment;

determining whether each of the objects of interest exists in the Delaunay triangulation;

responsive to determining that the object of interest exists in the Delaunay triangulation, updating the extent of the object of interest and generating a suspect queue, the suspect queue including the Voronoi vertices corresponding to the object of interest and the Voronoi vertices being paired with the object of interest; and determining whether the Voronoi vertices in the suspect queue are valid.

24. The computer program product of claim 23, wherein determining whether the Voronoi vertices in the suspect queue are valid comprises determining whether Voronoi spheres corresponding to the Voronoi vertices in the suspect queue include the paired object of interest.

25. The computer program product of claim 23, wherein updating the Delaunay triangulation comprises:
removing an invalid Voronoi vertex from the Delaunay triangulation;
generating new Voronoi vertices corresponding to four objects corresponding to the invalid Voronoi vertex;
determining whether the new Voronoi vertices are valid; and
responsive to determining that the new Voronoi vertices are valid, adding the new Voronoi vertices to the Delaunay triangulation.

26. The computer program product of claim 25, wherein determining whether the new Voronoi vertices are valid comprises determining whether Voronoi spheres corresponding to the new Voronoi vertices include the paired object of interest.

27. The computer program product of claim 25, wherein the new Voronoi vertices are generated by using a feasible sequential quadratic programming algorithm such that the new Voronoi vertices are tangent to the surfaces of the four objects.

28. The computer program product of claim 17, wherein determining whether Voronoi vertices corresponding to an object of interest are valid comprises:
creating an object list including all objects of interest within a view of the environment;
determining whether each of the objects of interest exists in the Delaunay triangulation;
responsive to determining that the object of interest does not exist in the Delaunay triangulation, adding the object of interest to the Delaunay triangulation, determining one invalid Voronoi vertex in the Delaunay triangulation, and generating a suspect queue, the suspect queue including Voronoi vertices corresponding to neighbor objects of the invalid Voronoi vertex and the Voronoi vertices being paired with the object of interest; and
determining whether the Voronoi vertices in the suspect queue are valid.

29. The computer program product of claim 28, wherein determining whether the Voronoi vertices in the suspect queue are valid comprises determining whether Voronoi spheres corresponding to the Voronoi vertices in the suspect queue include the paired object of interest.

30. The computer program product of claim 28, wherein updating the Delaunay triangulation comprises:
removing the invalid Voronoi vertex from the Delaunay triangulation;
generating new Voronoi vertices corresponding to four objects corresponding to the invalid Voronoi vertex;
determining whether the new Voronoi vertices are valid; and
responsive to determining that the new Voronoi vertices are valid, adding the new Voronoi vertices to the Delaunay triangulation.

31. The computer program product of claim 30, wherein determining whether the new Voronoi vertices are valid comprises determining whether Voronoi spheres corresponding to the new Voronoi vertices include the paired object.

32. The computer program product of claim 30, wherein the new Voronoi vertices are generated by using a feasible sequential quadratic programming algorithm such that the new Voronoi vertices are tangent to the surfaces of the four objects.

33. A system for representing for an observer a spatial relation among objects in an environment in the form of a Delaunay triangulation, the objects being represented by corresponding simplified objects having a volume, the system comprising:
a data input module for receiving image data corresponding to the environment and recognizing the objects in the image data; and
a Delaunay triangulation module for determining whether Voronoi vertices corresponding to an object of interest are valid, and updating the Delaunay triangulation for each invalid Voronoi vertex after motion relative to the environment, such that the Delaunay triangulation is consistent with the recognized objects, the motion relative to the environment caused by at least one of observer motion, addition of a new object to the environment, change of location of an existing object, or change of extent of an existing object.

34. The system of claim 33, further comprising a query module for carrying out a proximity query using the Delaunay triangulation.

35. The system of claim 33, wherein the simplified objects are cuboids.

* * * * *